(12) United States Patent
Bells et al.

(10) Patent No.: US 8,378,798 B2
(45) Date of Patent: Feb. 19, 2013

(54) METHOD AND APPARATUS FOR A TOUCH-SENSITIVE DISPLAY

(75) Inventors: Matthew Bells, Waterloo (CA); Jordanna Kwok, Waterloo (CA); Colin Ho, Ottawa (CA); Kuo-Feng Tong, Waterloo (CA); Deepankar Banshilal Jain, Winona Lake, IN (US); Douglas Clayton Rider, Ottawa (CA); Ian Paul Barta, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 273 days.

(21) Appl. No.: 12/579,981

(22) Filed: Oct. 15, 2009

(65) Prior Publication Data

US 2011/0018695 A1 Jan. 27, 2011

Related U.S. Application Data

(60) Provisional application No. 61/228,430, filed on Jul. 24, 2009.

(51) Int. Cl.
*G08B 6/00* (2006.01)
(52) U.S. Cl. .............. 340/407.2; 340/407.1; 345/168; 345/173; 345/174
(58) Field of Classification Search ........... 340/407.1; 345/184, 156, 161, 163, 167, 168, 173, 174
See application file for complete search history.

(56) References Cited

U.S. PATENT DOCUMENTS

| 5,313,027 | A | 5/1994 | Inoue | |
|---|---|---|---|---|
| 5,675,329 | A | 10/1997 | Barker et al. | |
| 6,758,615 | B2 | 7/2004 | Monney et al. | |
| 2002/0196238 | A1 | 12/2002 | Tsukada | |
| 2005/0065452 | A1* | 3/2005 | Thompson | 600/558 |
| 2006/0119586 | A1 | 6/2006 | Grant | |
| 2006/0197753 | A1* | 9/2006 | Hotelling | 345/173 |
| 2007/0013662 | A1* | 1/2007 | Fauth | 345/168 |
| 2007/0097151 | A1* | 5/2007 | Rosenberg | 345/660 |
| 2008/0024459 | A1* | 1/2008 | Poupyrev et al. | 345/173 |
| 2008/0088602 | A1* | 4/2008 | Hotelling | 345/173 |
| 2010/0156814 | A1* | 6/2010 | Weber et al. | 345/173 |
| 2011/0018695 | A1* | 1/2011 | Bells et al. | 340/407.2 |
| 2011/0227872 | A1* | 9/2011 | Huska et al. | 345/174 |

FOREIGN PATENT DOCUMENTS

GB 2402105 A1 12/2004

OTHER PUBLICATIONS

Brewster, Stephen A., et al.; Title: Pressure-Based Text Entry for Mobile Devices; MobileHCI09, Sep. 15-18, 2009; 4 pgs.
International Search Report and Written Opinion dated Mar. 25, 2010, issued on corresponding International Patent Application No. PCT/US2009/060856.

\* cited by examiner

*Primary Examiner* — Daryl Pope

(57) ABSTRACT

Method and apparatus for displaying a view of an application on a touch-sensitive display include detecting a touch on the touch-sensitive display. When the touch is at a first force, first feedback is provided and a first function is performed. When the touch is at a second force, second feedback is provided and a second function is performed. The first function and the second function are different. The first force and the second force are different.

30 Claims, 5 Drawing Sheets

METHOD AND APPARATUS FOR A TOUCH-SENSITIVE DISPLAY

CROSS REFERENCE TO RELATED APPLICATIONS

This non-provisional patent application claims the benefit of priority of the filing date of U.S. Provisional Patent Application Ser. No. 61/228,430, filed Jul. 24, 2009, the entire contents of which application are incorporated herein by reference.

FIELD OF TECHNOLOGY

The present disclosure relates to touch-sensitive displays, including, but not limited to, portable electronic devices having touch-sensitive displays.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 702.11 or Bluetooth capabilities. These devices run on a wide variety of networks from data-only networks such as Mobitex® and DataTAC® networks to complex voice and data networks such as GSM/GPRS, CDMA, EDGE, UMTS and CDM52000 networks.

Portable electronic devices such as PDAs or smart telephones are generally intended for handheld use and ease of portability. Smaller devices are generally desirable for portability. A touch-sensitive display, also known as a touch screen display, is particularly useful on such handheld devices, which are small and have limited space for user input and output. The information displayed on the touch-sensitive displays may be modified depending on the functions and operations being performed. With continued demand for decreased size of portable electronic devices, touch screen displays continue to decrease in size.

Improvements in touch screen devices are therefore desirable.

DETAILED DESCRIPTION

Figure 1:
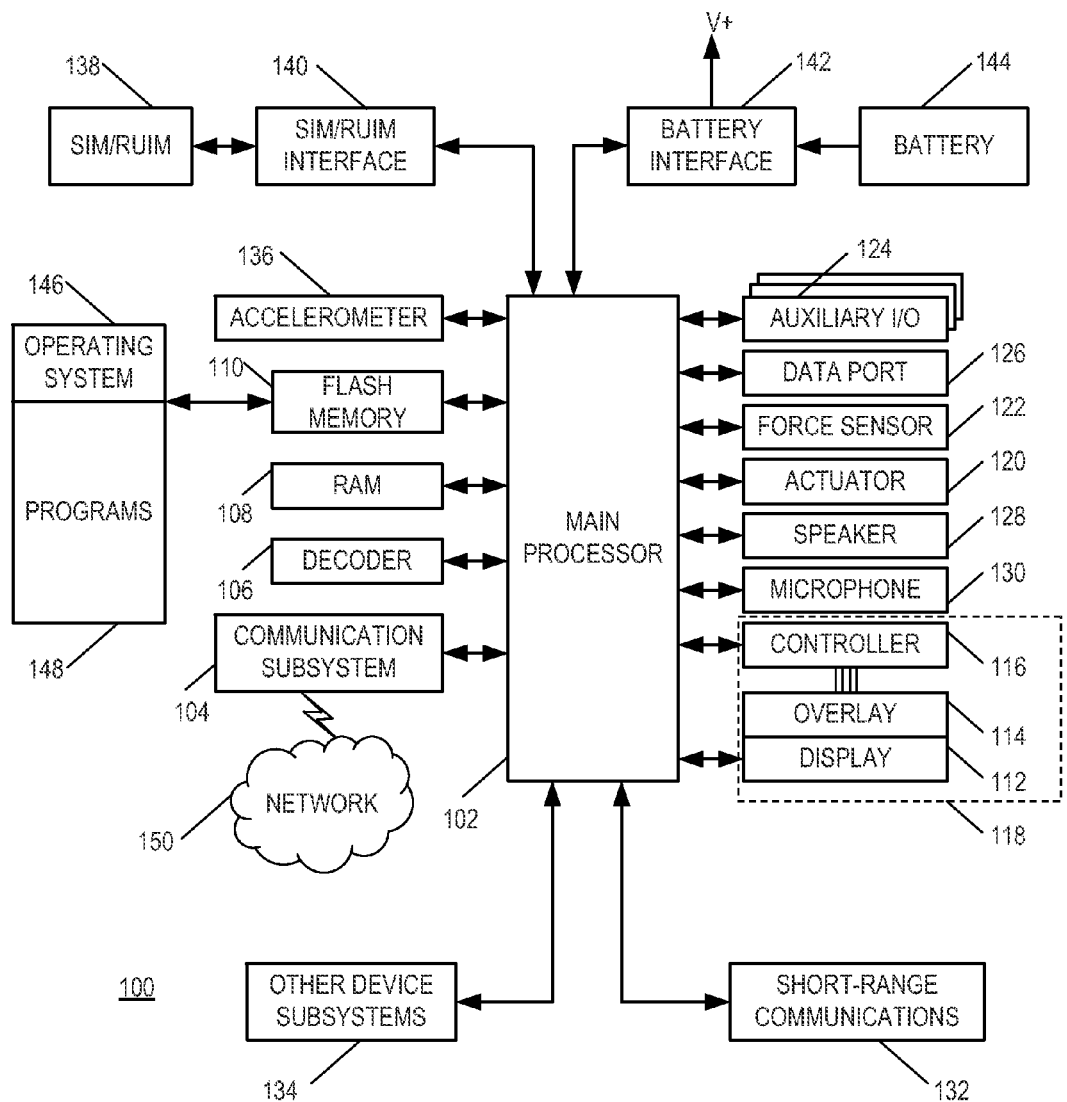
FIG. 1 is a block diagram of a portable electronic device in accordance with the present disclosure.

For simplicity and clarity of illustration, reference numerals may be repeated among the figures to indicate corresponding or analogous elements. In addition, numerous specific details are set forth in order to provide a thorough understanding of the embodiments described herein. The embodiments described herein may be practiced without these specific details. In other instances, well-known methods, procedures and components have not been described in detail so as not to obscure the embodiments described herein. Also, the description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities such as a handheld electronic game device, digital photograph album, digital camera, or other device.

A block diagram of an example of an embodiment of a portable electronic device 100 is shown in FIG. 1. The portable electronic device 100 includes a number of components such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together make up a touch-sensitive display 118, an actuator 120, a force sensor 122, an auxiliary input/output (I/O) subsystem 124, a data port 126, a speaker 128, a microphone 130, short-range communications 132 and other device subsystems 134. The processor 102 interacts with the touch-sensitive overlay 118 via the electronic controller 116. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The portable electronic device 100 also includes an operating system 146 and software components 148 that are executed by the processor 102 and are typically stored in a persistent store such as the flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is substantially similar except that the received signals are output to the speaker 128 and signals for transmission are generated by the microphone 130.

The touch-sensitive display 118 may be any suitable touch-sensitive display, such as a capacitive, resistive, infrared, or surface acoustic wave (SAW) touch-sensitive display, as known in the art. A capacitive touch-sensitive display includes the display 112 and a capacitive touch-sensitive overlay 114. The overlay 114 may be an assembly of multiple layers in a stack including, for example, a substrate, LCD display 112, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118 and processed by the processor 102, for example, to determine a location of a touch. Touch location data may include a single point of contact, such as a point at or near a center of the area of contact, or the entire area of contact for further processing. The location of a touch detected on the touch-sensitive display 118 may include x and y components, e.g., horizontal and vertical with respect to one's view of the touch-sensitive display 118, respectively. For example, the x location component may be determined by a signal generated from one touch sensor layer, and the y location component may be determined by a signal generated from another touch sensor layer. A signal is provided to the controller 116 in response to detection of a suitable object, such as a finger, thumb, or other items, for example, a stylus, pen, or other pointer, depending on the nature of the touch-sensitive display 118. More than one simultaneous location of contact may occur and be detected.

The actuator 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 provides the user with tactile feedback. When a mechanical dome switch actuator is utilized, tactile feedback is provided when the dome collapses due to imparted force and when the dome returns to the rest position after release of the switch.

The actuator 120 may comprise one or more piezoelectric (piezo) actuators that provide tactile feedback. Contraction of the piezo actuator(s) applies a spring-like force against the touch-sensitive display 118, opposing any force externally applied to the display 118. Each piezo actuator includes a piezoelectric device, such as a piezoelectric (PZT) ceramic disk adhered to a metal substrate. The metal substrate bends when the PZT disk contracts due to build up of charge at the PZT disk or in response to an external force applied to the touch-sensitive display 118. The charge may be adjusted by varying the applied voltage or current, thereby controlling the force applied by the piezo disks on the touch-sensitive display 118. The charge on the piezo actuator may be removed by a controlled discharge current that causes the PZT disk to expand, releasing the force thereby decreasing the force applied by the piezo disks on the touch-sensitive display 118. The charge may advantageously be removed over a relatively short period of time to provide tactile feedback to the user. Absent an external force applied to the overlay 114 and absent a charge on the piezo disk, the piezo disk may be slightly bent due to a mechanical preload.

Touch sensitive displays that provide feedback are known. A device, such as portable electronic device 100, incorporating a touch-sensitive display, may perform many different functions in response to a touch or movement of a touch. A device may distinguish between which function to perform based on a force of the touch detected by the device. For example, a device may disregard touches that are detected that are imparted with a force below a minimum threshold, perform a function when the force is above the minimum threshold, and perform a different function when the force is above another threshold that is higher than the minimum threshold. Any number of functions may be associated with any number of thresholds such that one or more specific functions are performed when various force thresholds are met. Alternatively, a mathematical correspondence between a force and feedback and function may be provided. Additionally, the device may provide an indication of which function is being performed through the use of any of tactile feedback, a visual indicator, and, an audible indicator, individually or in combination. Different tactile feedback, visual indicators, and visual indicators may be associated with the performance of different functions.

Figure 2:
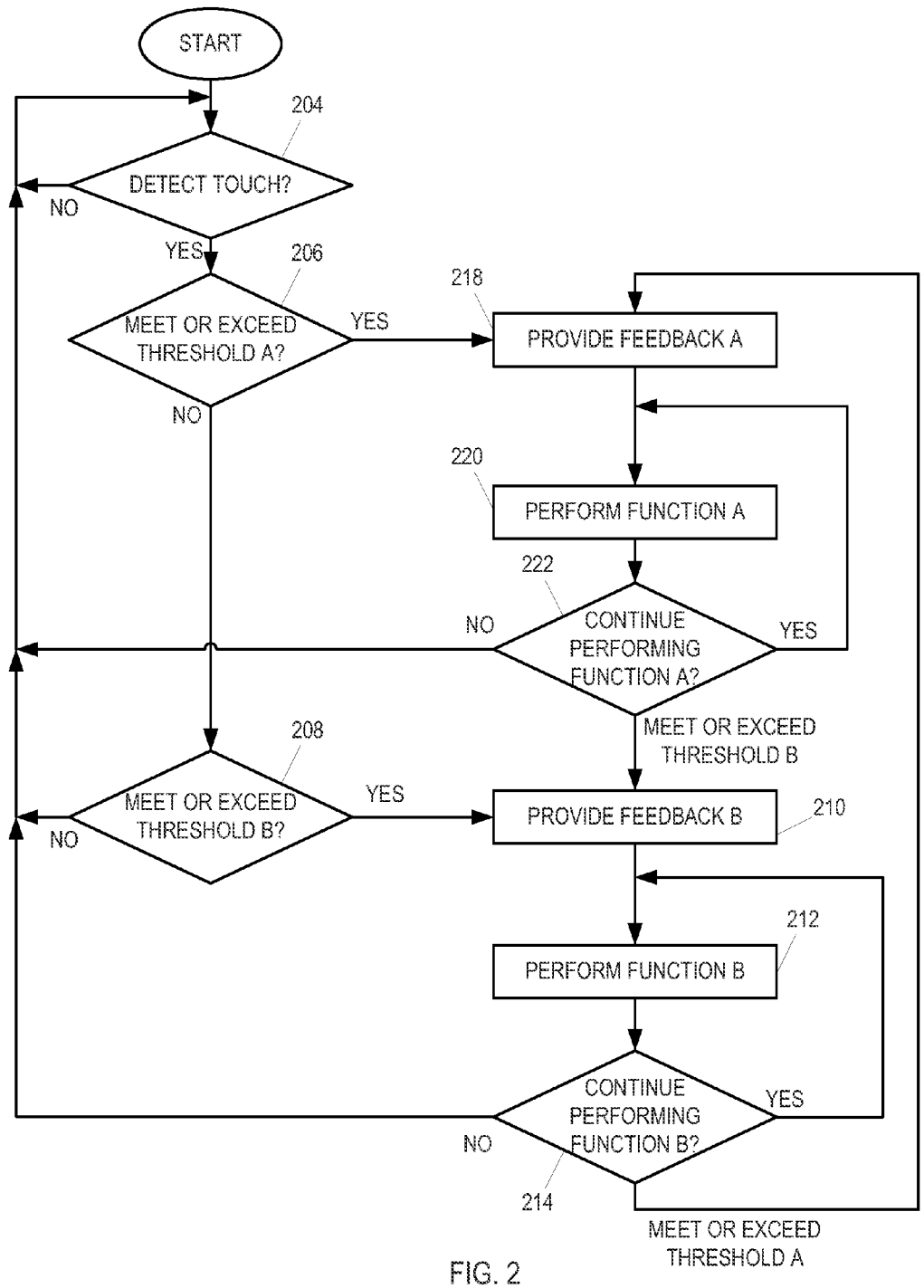
FIG. 2 and FIG. 17 each illustrate a flowchart of a method of providing feedback and performing functions based on force of a detected touch on a touch-sensitive display in accordance with the present disclosure.

A method of providing feedback and performing functions based on force thresholds on a touch-sensitive display is illustrated in the flowchart of FIG. 2. The method of FIG. 2 may be performed by software executed by one or more processors (e.g., the processor 102). Given the present disclosure, one of skill in the art is capable of coding of software for carrying out the method. Although the method is described with respect to the portable electronic device 100 of FIG. 1, the flowchart may apply to any portable electronic device, or any other devices comprising a touch-sensitive display that are not described herein. When a touch is detected 204 by the device 100, the process continues at 206. The detection of the touch may also include an indication of the force of the touch as measured, for example, by one or more force sensors of the device 100. The force sensors may be force sensitive resistors, strain gauges, piezoelectric or piezoresistive devices, pressure sensors, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities.

The force of the touch is compared 206 to a force threshold A, which is an amount of force related to a touch on a touch-sensitive display 118. This amount of force may be greater than an amount of force for threshold B. When the force meets or exceeds threshold A, the process continues at 218. When the force does not meet or exceed threshold A, the process continues at 208. Hysteresis, time meeting or exceeding a threshold, or other techniques may be employed to prevent repeated jumping between functions in a short period of time, such as when the force is near a threshold.

The portable electronic device 100 optionally provides 218 feedback associated with threshold A (feedback A) that may include tactile feedback via activation of one or more actuators 120, a visual indicator, and/or an audible indicator. The characteristics of the tactile feedback may be of any type, style, duration, and amplitude and may provide an indication that the device is about to perform a new or different function. The type of tactile feedback may include a buzz, vibration, pulse, or other types of tactile feedback. The tactile feedback may comprise one or more different types of tactile feedback, for example, two pulses followed by a longer vibration. The duration of tactile feedback may be of any suitable length. The amplitude of tactile feedback may be based on any of the state of the device, the amount of power being provided to the device, or the application(s) being executed by the portable electronic device 100, and so forth. Further, the tactile feedback of feedback A may indicate that function A is being performed.

The audible and visual indicators may be of any type and duration and may provide an indication what function the device is performing. The type of the visual indication may include a small image displayed in a portion of the display area of the portable electronic device 100 and so forth. The visual indicator may flash at any rate or be displayed for any length or duration of time and may indicate that function A is being performed. The type of audible indication may include any type of sound lasting for any suitable duration and indicates that function A is being performed.

The device 100 performs 220 function A, as appropriate. Examples of functions associated with threshold A are described below.

When a determination is made at 222 to continue performing function A, the process continues at 220. When the force of the touch meets or exceeds threshold B at 222, the process continues at 210. In other words, when the touch meets or exceeds threshold B subsequent to when the touch meets or exceeds threshold A, feedback B is provided and function B performed. When a determination is made at 222 to discontinue performing function A, such as when the force of the touch is less than threshold B, the process continues at 204.

The determination of whether to continue performing function A may be based on any of a number of factors. For example, function A may continue to be performed even when the force of the touch drops below threshold A and/or threshold B and may only stop when a subsequent touch is detected that meets or exceeds threshold B. In other words, a first touch associated with a force that meets or exceeds threshold A starts the performance of function A and a subsequent touch that meets or exceeds threshold B stops the performance of function A. As another example, the performance of the function may stop when the force associated with the touch is less than threshold A. In other words, a touch associated with a force that meets or exceeds threshold A starts the performance of function A, and when the force associated with that touch is than threshold A, the performance of function A stops. As another example, function A may be performed once and the process may wait for the force to decrease below a different lower threshold of force.

Other actions or events may affect whether or not to continue performing a function, such as exiting the current application, entering another application, entering a menu and selecting an item that changes the current function or feature, completion of the current function, and so forth.

The force of the touch is compared 208 to a force threshold B, which is an amount of force related to a touch on a touch-sensitive display 118. When the force meets or exceeds the threshold B, the process continues at 210. When the force does not meet or exceed the threshold B, the process continues at 204.

The device 100 optionally provides feedback B 210, for example, by activating one or more actuators 120, displaying a visual indicator, and providing an audible indicator. Feedback B may be similar to feedback A, although the characteristics of feedback B may differ and may provide an indication that a new or different function is being performed. Further, feedback B may comprise any of tactile feedback, a visual indicator, or an audible indicator that may indicate that function B is being performed.

The device 100 performs 212 a function B as appropriate. Examples of functions associated with threshold B are described below. Additionally, the performance of the function B may change based on whether another function (e.g., function A) has been performed or any other criteria of the application or device 100.

When a determination is made at 214 to continue performing function B, the process continues at 212. When the force of the touch meets or exceeds threshold A at 214, the process continues at 218. When a determination is made at 214 to discontinue performing function B, such as when the force of the touch is less than threshold A, the process continues at 204. As discussed above with regard to the performance of function A, the determination of whether to continue performing function B may be based on any of a number of factors.

Although the flowchart of FIG. 2 is described when threshold A is greater than threshold B, alternative embodiments may compare the force of the touch to a lesser force threshold and then to a greater force threshold. Other embodiments may utilize a table to map force amounts to functions. Although not shown in the drawings, functions A or B may cease to be performed for reasons other than described herein, and the process either terminates or continues at 204. The various force thresholds discussed above may be fixed or variable. A force threshold may be changed by one or more functions that are performed. For example, function A may slowly and continuously increase such that a continuously harder force may be required to continue to perform function A.

Additionally or alternatively, any number of different force thresholds may be utilized in accordance with the teachings of the disclosure, wherein different functions may be performed when the force of the touch meets or exceeds the various thresholds. For example, an alternative embodiment may have three different force thresholds and three different functions, wherein the first, second, and third functions are performed when the first, second, and third force thresholds are met or exceeded, respectively. For example, utilizing three force thresholds and three functions may be applied to character entry in a character entry field, such as email or texting. At a first force, e.g., at or below a first force threshold, the first function may include highlighting a character displayed on the touch-sensitive display 118. At a second force, e.g., at or below a second force threshold, the second function may include entering a lower-case character in a character entry field. At a third force, e.g., at or below a third force threshold, the third function may include entering an uppercase character, e.g., a capitalized or shifted version, in the character entry field. The third function may alternatively include entering a symbol, numeral, punctuation, or other character as may be associated with a symbol key or alternative key. The third function may alternatively include entering bolded, underscored, italicized, or highlighted text. The three levels of feedback may be, for example, none, a simulation of a key depression and release, and a vibration or a combination vibration with simulation of a key depression and release.

Examples of functions associated with thresholds A and B include engaging/disengaging a shift lock, alt key lock, or symbol lock; zooming or panning an image, map, webpage, or picture; selecting text within a text field; scrolling, panning, or zooming at a various rates; activating a hyperlink in a webpage; taking continuous photographs, or any other function of an application executed on the portable electronic device 100. A relationship between the A and B functions is advantageously useful. For example, higher force levels may engage a shift lock or other type of keyboard lock while lower force levels either disengage a shift lock or other type of keyboard lock or utilize unshifted keyboard entries. More detailed examples are described below. Further, when the device changes or transitions from performing one function to performing a different function, the device 100 may provide tactile feedback with specific characteristics to provide an indication of which function is being performed.

Figure 17:
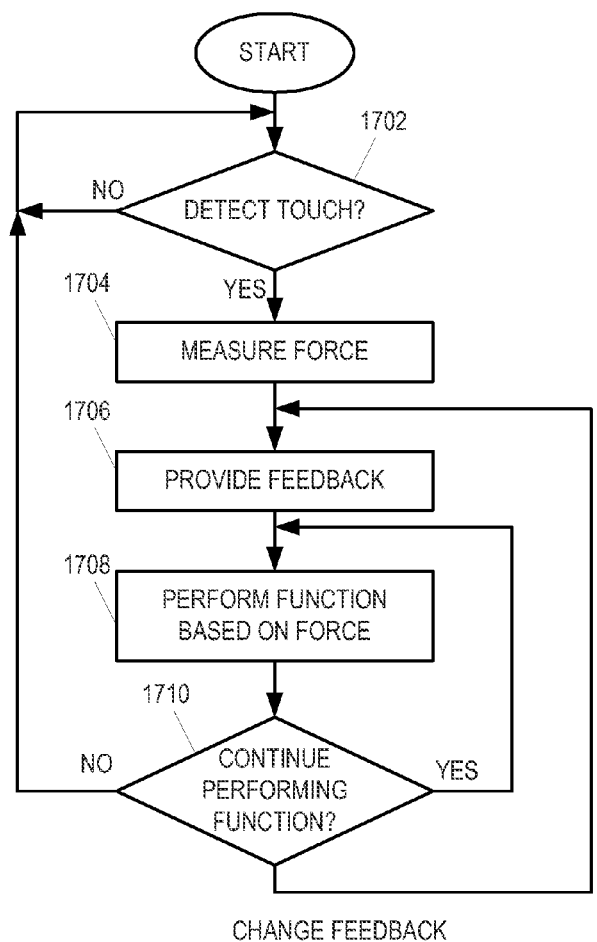

A method of providing feedback and performing functions based on a mathematical correspondence with a force imparted on a touch-sensitive display is illustrated in the flowchart of FIG. 17. The method of FIG. 17 may be performed by software executed by one or more processors (e.g., the processor 102). Given the present disclosure, one of skill in the art is capable of coding of software for carrying out the method. Although the method is described with respect to the portable electronic device 100 of FIG. 1, the flowchart may apply to any portable electronic device, or any other devices comprising a touch-sensitive display that are not described herein. When a touch is detected 1702 by the device 100, the process continues at 1704.

The portable electronic device 100 may measure or otherwise determine 1704 an amount of force associated with the detected touch via the one or more force sensors 122 of the device 100. After measuring the force, the process continues at 1706. Optionally, the measured force may be compared to a minimum threshold, below which no touch is considered to be detected.

The portable electronic device 100 optionally provides 1706 feedback. The feedback may be tactile, visual, audible, and so forth and may be of any suitable type, style, duration, and amplitude. The feedback may be based on the amount of force measured at 1704 by the device 100. For example, tactile feedback of different amplitudes may be provided. For example, the amplitude of the feedback may be proportionally based on the amount of force, such that the device 100 provides a greater amplitude of feedback for a touch imparted with a greater force.

The portable electronic device 100 performs 1708 a function that is based on the force associated with the touch. For example, when scrolling, panning, or zooming an image displayed on device 100, the amount of scrolling, panning, or zooming may be related to the force. For example, when a harder force is detected, scrolling, panning, or zooming may be farther or faster than for a softer force.

When a determination is made at 1710 to continue performing the function, the process continues at 1708. When a determination is made at 1710 to change the feedback, the process continues at 1706. The feedback may be changed based on a change in the amount of force currently being measured or for any other suitable reason. For example, tactile feedback may be provided for 500 milliseconds, but when the function has been operating for five seconds, the device 100 may provide another 500 milliseconds of feedback that indicates the continued performance of the function. When a determination is made at 1710 to discontinue performing function, for reasons such as those described above with respect to processes 214 and 222, the process continues at 1702.

Figure 3:
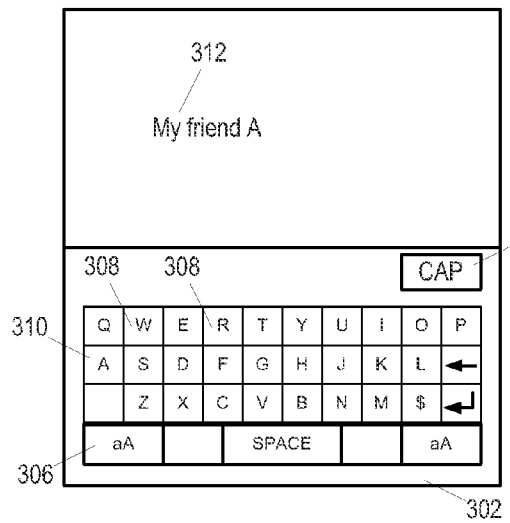
FIG. 3 and FIG. 4 illustrate an application of force thresholds to text entry on a touch-sensitive display in accordance with the present disclosure.
Figure 4:
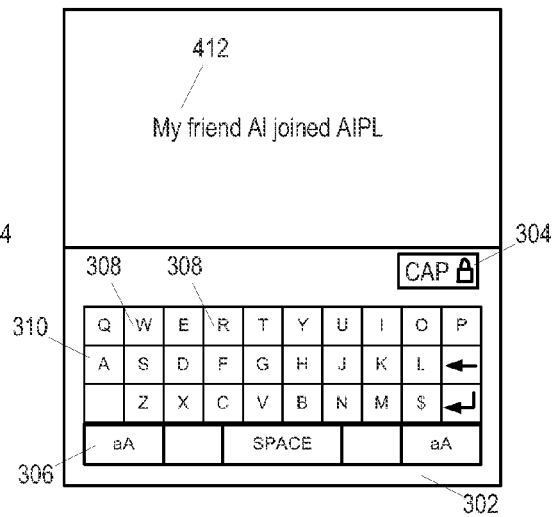

A virtual keyboard 302 that may be displayed on the touch-sensitive display 118 of the portable electronic device 100 is shown in FIG. 3 and FIG. 4. The virtual keyboard may include images of multiple keys 308 and 310 for various characters, such as letters, numbers, punctuation marks, and symbols. Entry of information through selection of these keys may be input to applications executed by device 100.

An example of a key is a shift key 306. When the shift key is selected with sufficient force to meet or exceed the force threshold B, only the next character key selected is entered in shifted version. For example, when the "A" key 310 is selected, a lowercase "a" is input, but when the shift key 306 is selected at a force that meets or exceeds threshold A and is less than threshold B before the "A" key 310 is selected, an uppercase "A" is input. For example, the "A" in the text "My friend A" 312, is entered when the A key 310 is selected after the shift key 306 is selected with a force that meets or exceeds threshold A and is less than threshold B. Subsequent selections of keys input lowercase characters. The visual indicator 304 ("CAP") indicates that the shift key 306 was selected to signify that the next key selection will result in an uppercase or capital letter.

In this example, the shift lock is engaged due to selection of the shift key 306 with force that meets or exceeds threshold A. While the shift lock is engaged, any key selection results in entry of an uppercase or capitalized input until the shift lock is disengaged. For example, the "AIPL" in the text "My friend Al joined AIPL" 412 is entered after the shift key 306 is selected with a force above threshold A. The visual indicator 404 includes the letters "CAP" and a picture of a lock that indicate that subsequent key selections input uppercase or capital letters until the shift lock is disengaged. The shift lock may be disengaged, for example, by selecting the shift key 306 at any detected force threshold, e.g., above threshold B. The examples of FIG. 3 and FIG. 4 may be similarly applied to an alt (alternative) key, a symbol key, or other key that selects a different set of values for the keys of the virtual keyboard. Function A corresponds to the shift lock function shown in FIG. 4, and function B corresponds to the basic shift function shown in FIG. 3.

Other types of functions may be associated with different amounts or levels of force. For example, the repeat rate of character input when a key is selected and held may be related to the force associated with the touch. For example, when the "A" key 310 is selected and held, an "a" is repeatedly input at a first rate while the force of the touch on the "A" key 310 meets or exceeds threshold A and is less than threshold B. When the "A" key 310 is selected and held, an "a" is repeatedly input at a second rate while the force of the touch on the "A" key 310 meets or exceeds threshold A. Alternatively, many different rates of character entry may be utilized based on the force of the detected touch. For example, a linear, exponential, or polynomial relation between the force and the input rate may be utilized. Thus, smaller forces are associated with slower repeat rates and larger forces are associated with faster repeat rates. Alternatively, an inverse relationship may be utilized, wherein smaller forces are associated with faster repeat rates and larger forces are associated with slower repeat rates. Tactile feedback may be provided in accordance with the amount of force. In this example, faster repeat rates may be accompanied by higher frequency vibration or more pulses, whereas slower repeat rates may be accompanied by lower frequency vibration or fewer pulses.

The force threshold sufficient to activate different keys may be different. For example, one force threshold may be utilized to delete a single character from a text field, another force threshold may be utilized to delete a word of text, another force threshold may be utilized to delete a sentence of text, and yet another threshold to delete an entire field of text. Advantageously, the higher forces are associated with larger deletions to prevent unwanted deletions of large amounts of text. Similarly, selection of a pop up window's "OK" button or "Cancel" button may have different force thresholds depending on the type of action performed. For example, when deleting a file, the force threshold for the "OK" virtual button may be greater than the force threshold for the "Cancel" virtual button to reduce the inadvertent deletion of files.

Figure 5:
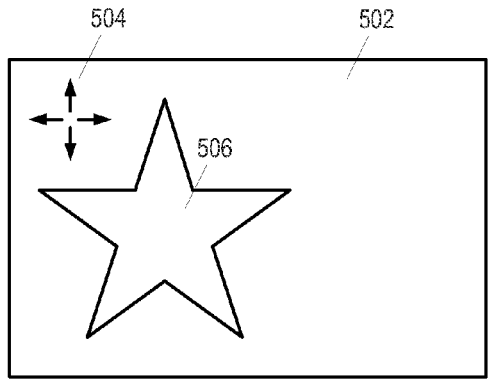
FIG. 5, FIG. 6, FIG. 7, and FIG. 8 illustrate an application of force thresholds to panning and zooming on a touch-sensitive display in accordance with the present disclosure.
Figure 6:
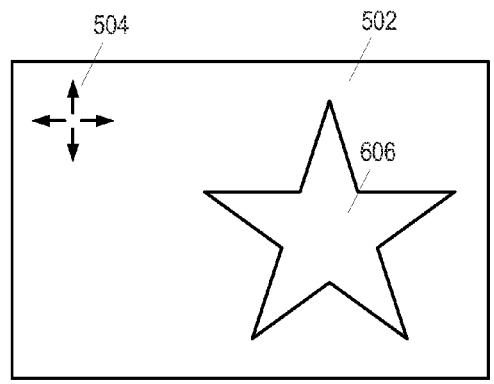
Figure 7:
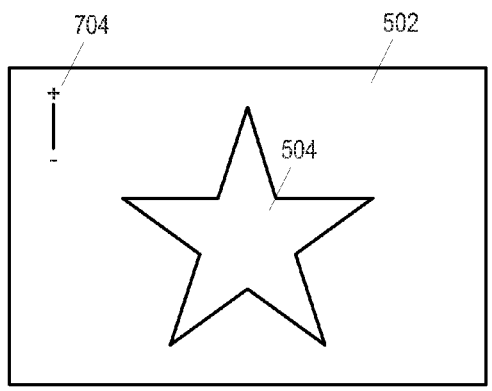
Figure 8:
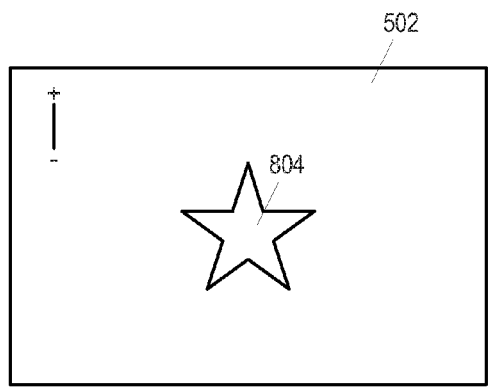

A picture, map, webpage, image, and so forth is shown in the display area 502 of FIG. 5, FIG. 6, FIG. 7, and FIG. 8. When a touch is detected in conjunction with a force that meets or exceeds threshold A, tactile feedback may be provided along with a visual indicator 504, and the picture, map, webpage, or image is panned. For example, the star at a first location 506 in FIG. 5 is panned to as second location 606 in FIG. 6. Panning may alternatively take place proportionally to the amount of force.

When a touch is detected in conjunction with a force that meets or exceeds threshold B but not threshold A, tactile feedback and a visual indicator, a zoom bar, 704 may be provided by the device 100 and the picture, map, webpage, or image may be zoomed in or out. For example, when the touch moves in the direction from the minus sign toward the plus sign on the zoom bar 704, the zoom or size of the picture, map, webpage, or image increases, and when the touch moves in the direction from the plus sign toward the minus on the zoom bar 704, the zoom or size of the picture, map, webpage, or image decreases, as shown by the star 704 in FIG. 7 being decreased in size to the star 804 in FIG. 8. Zooming may alternatively take place proportionally to the amount of force.

Figure 9:
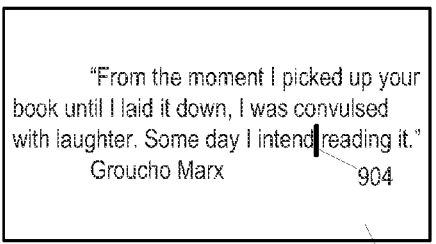
FIG. 9 and FIG. 10 illustrate an application of force thresholds to text selection on a touch-sensitive display in accordance with the present disclosure.
Figure 10:
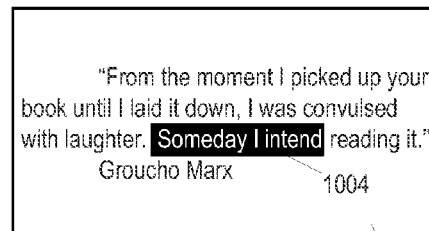

A display area 902 showing text in a text editor is shown in FIG. 9 and FIG. 10. When a touch on the text field is detected in conjunction with a force that meets or exceeds threshold A, tactile feedback may be provided and a cursor 904 is placed within the text at the location of the touch, as shown in FIG. 9. When a touch on the text field is detected in conjunction with a force that meets or exceeds threshold B but does not meet or exceed threshold A, tactile feedback may be provided and a section of text 1004 is selected, as shown in FIG. 10. Cursor 904 and highlighted text 1004 act as visual indicators of the function being performed. The selection may advantageously be based on detected movement of the touch, which is movement takes place toward the left side of the display area 902, as shown in FIG. 10.

Figure 11:
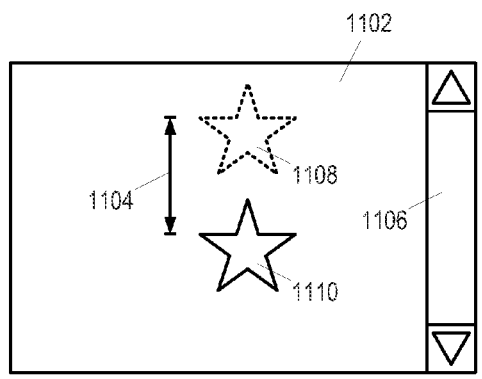
FIG. 11 and FIG. 12 illustrate an application of force thresholds to scrolling on a touch-sensitive display in accordance with the present disclosure.
Figure 12:
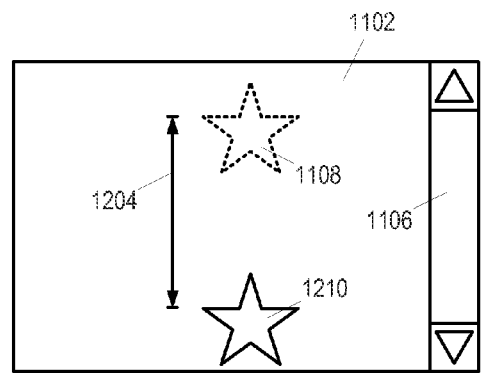

Scrolling through a document, picture, webpage, or image is shown in the display area 1102 of FIG. 11 and FIG. 12. When a touch is detected on a scroll bar 1106, and the touch moves, the scrolling takes place over a first distance 1104, e.g., the star moves from a first location 1108 to a second location 1110, when the force of the touch meets or exceeds threshold B, as shown in FIG. 11.

When a touch is detected on the scroll bar 1106 and the touch moves, scrolling takes place over a second distance 1204, e.g., the star moves from the first location 1108 to a third location 1210, when the force of the touch meets or exceeds threshold A, as shown in FIG. 12. Alternatively, the distance 1204 scrolled may be proportional to the force applied, thus the amount of scrolling may be proportional to the force applied, and more than two different scrolling distances may be utilized. Alternatively, an inverse relationship between the distance scrolled and the amount of the force may be utilized. Additionally or alternatively to scrolling, an application may pan or zoom a view of the document, picture, or image at a rate that is related to the amount of force detected based on any of a linear, exponential, polynomial, or inverse relationship.

Figure 13:
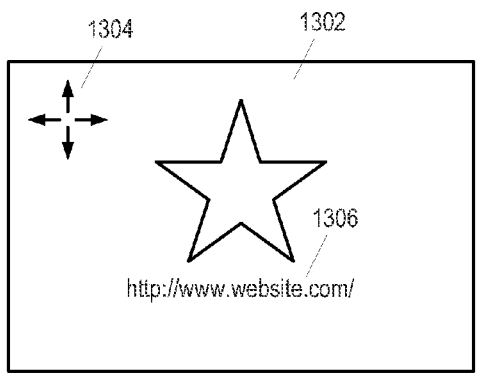
FIG. 13 and FIG. 14 illustrate an application of force thresholds to browsing a webpage on a touch-sensitive display in accordance with the present disclosure.
Figure 14:
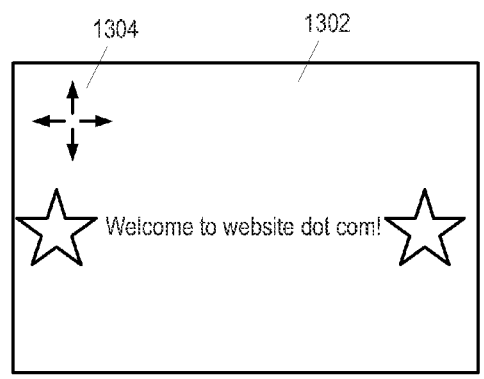

Scrolling through a document, picture, webpage, or image is shown in the display area 1302 of FIG. 13 and FIG. 14. When a touch is detected in conjunction with a force that meets or exceeds threshold A, tactile feedback and a visual indicator 1304 may be provided, and the picture, map, webpage, or image is panned, similar to how the picture, map, webpage, image, and so forth of FIG. 3 and FIG. 4 are panned. When a touch is detected in conjunction with a force that meets or exceeds threshold A, tactile feedback and a visual indicator 1304 may be provided, which may be different from the tactile feedback provided with respect to threshold A, and a function is performed. For example, when the touch is detected at the location of the hyperlink 1306, the hyperlink is activated by loading the webpage associated with the hyperlink.

Figure 15:
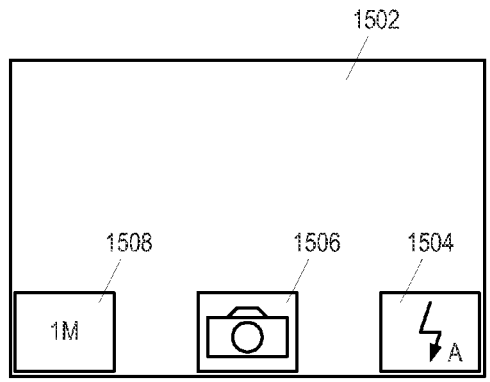
FIG. 15 and FIG. 16 illustrate an application of force thresholds to using a camera with a touch-sensitive display in accordance with the present disclosure.
Figure 16:
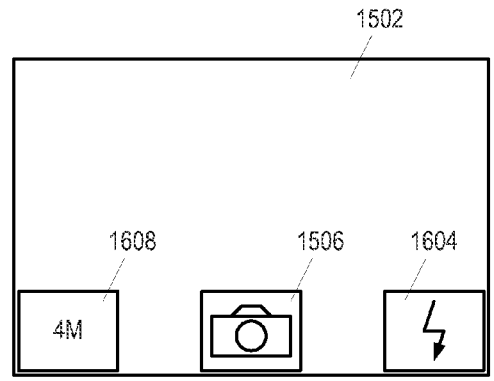

A display area 1502 illustrating photographic controls is shown in FIG. 15 and FIG. 16. A plurality of virtual buttons 1504, 1506, and 1508 may perform different functions at or beyond different force thresholds.

A detected touch selecting the flash virtual button 1504, which meets or exceeds threshold B but not threshold A, toggles whether an auto-flash function is enabled. When the force of the touch of the flash button 1504 meets or exceeds threshold A, the flash function toggles between on, off, and auto-flash and the image of the button 150 changes to that of the flash button 1604 shown in FIG. 16, and the flash is engaged on all subsequent pictures until disengaged. Subsequent touches above threshold A toggle the flash feature between on, off, and auto-flash.

A detected touch that meets or exceeds threshold B but not threshold A and is determined to select the shutter virtual button 1506, causes the device 100 to prepare to take a picture, e.g., perform autofocus or store a previously taken picture. When the force of the touch of the shutter button 1506 meets or exceeds threshold A, the device 100 takes or stores the picture. Optionally, when the force meets or exceeds threshold B, a single picture may be taken and when the force meets or exceeds threshold A, multiple pictures may be taken.

A detected touch that meets or exceeds threshold B but not threshold A and is determined to select the resolution virtual button 1508 selects a first image resolution, e.g., "1 M" for one megapixel. When the force of the touch of the resolution button 1508 meets or exceeds threshold A, the resolution increases to 4 M and the image of the resolution button 1508 changes to of the image of the resolution button 1608 shown in FIG. 16. Alternatively, a pop-up window or menu may be displayed for a limited duration to display resolutions available for selection.

The preceding discussion describes various touches, presses, selections, and gestures that may be detected by the device 100. The types of touches, presses, selections, and gestures may include those that are detected to correspond to a single finger or stylus touching the touch-sensitive display and may also include those that are detected to correspond to multiple fingers or styluses touching the touch-sensitive display. Devices, such as portable electronic devices, incorporating the teachings of the disclosure advantageously provide for performing many different functions for a touch or motion of a touch and provide an indication of which function is being performed through the use of tactile feedback and visual indicators.

A method comprises detecting a touch on a touch-sensitive display. When a force of the touch meets or exceeds a first threshold: providing first tactile feedback and performing a first function. When a force of the touch meets or exceeds a second threshold: providing second tactile feedback and performing a second function. The first function and the second function are different.

An apparatus comprises a touch sensor that detects a touch on a touch-sensitive display. One or more processors are configured to, when the touch is at a first force, provide first feedback and perform a first function and when the touch is at a second force, provide second feedback and perform a second function. The first function and the second function are different, and wherein the first force and the second force are different. The feedback comprises at least one of tactile feedback, visual feedback, and audible feedback.

An alternative method comprises detecting a touch on a touch-sensitive display. When the touch is at a first force, providing first feedback and performing a first function. When the touch is at a second force, providing second feedback and performing a second function. The first function and the second function are different, and wherein the first force and the second force are different.

Additionally, embodiments incorporating the teachings of the disclosure may comprise one or more processors that execute computer readable code from one or more computer-readable media to perform the method(s) described herein. Such computer-readable media may include, but are not limited to, CDs, DVDs, read-only memory, random-access memory, memory caches, and so forth.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
    detecting a touch on a touch-sensitive display;
    when a force of the touch meets or exceeds a first threshold:
        providing first tactile feedback;
        performing a first function;
    when a force of the touch meets or exceeds a second threshold that is greater than the first threshold:
        providing second tactile feedback;
        performing a second function;
    wherein the first function and the second function are different.

2. The method of claim 1, wherein the first tactile feedback indicates the first function and the second tactile feedback indicates the second function.

3. The method of claim 1, further comprising:
    when a force of the touch meets or exceeds a first threshold, providing at least one of a first visual indication and a first audible indication;
    when a force of the touch meets or exceeds a second threshold, providing at least one of a second visual indication and a second audible indication;
    wherein the at least one of the first visual indication and the first audible indication indicates the first function and the at least one of the second visual indication and the second audible indication indicates the second function.

4. The method of claim 1, further comprising, when the touch meets or exceeds the first threshold subsequent to meeting or exceeding the second threshold, providing the first tactile feedback and performing the first function.

5. The method of claim 1, wherein the first function comprises autofocusing a camera and the second function comprises taking a picture.

6. The method of claim 1, wherein the first function comprises one of: activating a virtual key displayed on the touch-sensitive display, panning a displayed picture, positioning a curser in a displayed text field, and a focus function for a photographic application; and wherein the second function comprises one of: activating a lock of a virtual key of a virtual keyboard displayed on the touch-sensitive display, adjusting a zoom of a picture displayed on the touch-sensitive display, selecting text within a text field displayed on the touch-sensitive display, and taking a picture.

7. The method of claim 1, wherein performance of at least one of the first function or the second function is based at least in part on a mathematical correlation to the force detected wherein the mathematical correlation is at least one of linear, exponential, polynomial, and inverse.

8. The method of claim 1, wherein the first function comprises panning an image and the second function comprises activating a hyperlink associated with the image.

9. A computer-readable medium having computer-readable code executable by at least one processor to perform the method of claim 1.

10. An apparatus comprising:
    a touch sensor that detects a touch on a touch-sensitive display;
    one or more processors configured to:
        when the touch is at a first force that meets or exceeds a first threshold, provide first feedback and perform a first function;
        when the touch is at a second force that meets or exceeds a second threshold greater than the first force threshold, provide second feedback and perform a second function;
    wherein the first function and the second function are different, and wherein the first force and the second force are different;
    wherein the feedback comprises at least one of tactile feedback, visual feedback, and audible feedback.

11. The apparatus of claim 10, further comprising one or more force sensors that detect the force.

12. The apparatus of claim 11, wherein the one or more force sensors comprise at least one of a force sensitive resistor, a strain gauge, a piezoelectric device, a piezoresistive device, or a pressure sensor.

13. The apparatus of claim 10, wherein the first feedback indicates the first function and the second feedback indicates the second function.

14. The apparatus of claim 10, wherein the touch meets or exceeds a second threshold subsequent to when the touch meets or exceeds the first threshold.

15. A portable electronic device comprising the apparatus of claim 10.

16. A method comprising:
    detecting a touch on a touch-sensitive display;
    when the touch is at a first force that meets or exceeds a first threshold, providing first feedback and performing a function at a first rate;
    when the touch is at a second force that meets or exceeds a second threshold greater than the first force threshold, providing second feedback and performing the function at a second rate that is different than the first rate.

17. The method of claim 16, wherein the feedback comprises at least one of tactile feedback, visual feedback, and audible feedback.

18. The method of claim 10, wherein the first function comprises highlighting a character displayed on the touch-sensitive display, wherein the second function comprises entering a lower-case character in a character entry field, further comprising when the touch is at a third force, entering an upper-case character in the character entry field.

19. The method of claim 16, wherein the function comprises scrolling or panning a displayed image.

20. The method of claim 16, wherein the function comprises zooming a displayed image.

21. The method of claim 16, wherein the function comprises repeatedly entering a character.

22. The method of claim 16, wherein the function comprises taking a picture.

23. The method of claim 16, wherein performing the function at the first rate comprises deleting a first quantity of text and performing the function at the second rate comprises deleting a second quantity of text greater than the first quantity of text.

24. The method of claim 16, wherein the first rate and the second rate are proportional to the first force and the second force, respectively.

25. A method comprising:
   detecting a touch on a touch-sensitive display;
   when the touch is at a first force, providing first feedback and performing a function at a first rate proportional to the first force;
   when the touch is at a second force, providing second feedback and performing the function at a second rate proportional to the second force;
   when the touch is at a third force, providing third feedback and performing the function at a third rate proportional to the third force;
   wherein the first force is below a first force threshold, the second force exceeds the first threshold and is below a second force threshold, and the third force meets or exceeds the second force threshold.

26. The method of claim 25, wherein the function comprises panning or zooming a displayed image.

27. The apparatus of claim 10, wherein the first function comprises one of:
   activating a virtual key displayed on the touch-sensitive display, panning a displayed picture, positioning a curser in a displayed text field, and a focus function for a photographic application; and wherein the second function comprises one of:
   activating a lock of a virtual key of a virtual keyboard displayed on the touch-sensitive display, adjusting a zoom of a picture displayed on the touch-sensitive display, selecting text within a text field displayed on the touch-sensitive display, and taking a picture.

28. The apparatus of claim 10, wherein performance of at least one of the first function or the second function is based at least in part on a mathematical correlation to the force detected wherein the mathematical correlation is at least one of linear, exponential, polynomial, and inverse.

29. The method of claim 16, wherein performing the function is based at least in part on a mathematical correlation to the force detected wherein the mathematical correlation is at least one of linear, exponential, polynomial, and inverse.

30. The method of claim 25, wherein performing the function is based at least in part on a mathematical correlation to the force detected wherein the mathematical correlation is at least one of linear, exponential, polynomial, and inverse.

* * * * *